United States Patent Office 3,708,448
Patented Jan. 2, 1973

3,708,448
COATING COMPOSITION
Anthony D. Ippolito, Trenton, and Howard Van Arsdale, Robbinsville, N.J., assignors to NL Industries, Inc., New York, N.Y.
No Drawing. Filed July 13, 1971, Ser. No. 162,278
Int. Cl. C09j 3/26
U.S. Cl. 260—24          11 Claims

ABSTRACT OF THE DISCLOSURE

A protective coating composition for metal surfaces, such as printed circuit boards and the like, which are subjected to soldering operations, has been prepared, said composition consisting essentially of a mixture of rosin and polyurethane dissolved in an organic solvent, the amount of rosin present in said composition being from 10 to 50 parts for each part of polyurethane and the amount of solvent being from 70 to 95 parts for each 5 to 30 parts of rosin.

The protective coating composition of this invention is also compatible with a rosin fluxing system and therefore the protective coating does not have to be removed prior to soldering.

BACKGROUND OF THE INVENTION

In preparing metal objects which are to be subjected to soldering operations, it is desirable to have the surface of the metal object substantially free from oxide compounds.

Some of the previous methods used for protecting the surface of metal objects were to wrap the material in plastic containers or to mold a strippable coating onto the surface of the metal object.

It was found however, that the plastic wrappers did not insure good resistance to contamination and allowed oxidation of the metal surface. The strippable materials also were not completely resistant to high humidity conditions. In addition, these strippable materials were difficult to remove prior to soldering and in some cases left residues on the material so that soldering was not possible.

SUMMARY OF THE INSTANT INVENTION

A protective coating composition for metal surfaces which is compatible with rosin fluxes consisting essentially of rosin and polyurethane dissolved in an organic solvent, the amount of rosin present in said composition from 10–50 parts for each part of polyurethane and the amount of solvent being from 70 to 95 parts for each 5 to 30 parts of rosin. The amount of rosin present in the composition is from 5% to 30% while the amount of polyurethane present is from 0.25% to 2.0%. The organic solvent is present in the composition in amount of 70% to 95%.

The organic solvent used in the instant invention is selected from the group consisting of an aliphatic ketone having from 3 to 8 carbon atoms, benzene and an alkyl substituted benzene having from 1 to 3 carbon atoms, an aliphatic alcohol having from 1 to 4 carbon atoms and mixtures thereof. Although the organic solvent may be composed of only one of these organic compounds, a particular desirable solvent is a mixture of two or all three of these constituents. In such mixtures the solvent advantageously may consist of from 0% to 75% aliphatic ketone having from 3 to 8 carbon atoms, 0% to 50% benzene and an alkyl substituted benzene having from 1 to 3 carbon atoms and 0% to 100% aliphatic alcohol having from 1 to 4 carbon atoms, all of the percentages are expressed on a weight basis.

Such a composition is particularly unique in that it possesses the following properties:

(1) it produces a continuous dry coating
(2) the dry coating is non-tacky
(3) the dry coating is flexible
(4) the coating is compatible with a rosin flux
(5) the coating prevents oxidation of the metal surface upon which it is applied
(6) the coating is not corrosive

DESCRIPTION OF PREFERRED EMBODIMENTS

A rosin coating usually produces a tacky and brittle coating on a metal surface. The dried coating cracks and peels and therefore does not protect the metal surface under the coating from oxidizing.

It has been found that a non-tacky and non-brittle coating may be prepared by using the composition of the instant invention. The presence of polyurethane renders the coating flexible while the vehicle employed in the composition produces a coating composition which may be spread onto a metal surface to produce an even coat of a continuous film which does not dry too fast or too slow.

As stated above the organic solvent may consist of one or more of the following ingredients: an aliphatic ketone having from 3 to 8 carbon atoms, benzene and an alkyl substituted benzene having from 1 to 3 carbon atoms and an aliphatic alcohol having from 1 to 4 carbon atoms.

The aliphatic ketones contemplated in this instant invention are lower aliphatic ketones having from 3 to 8 carbon atoms which include acetone, methyl ethyl ketone, 3-pentanone, methyl isobutyl ketone, methyl propyl ketone, methyl isopropyl ketone, methyl cyclohexyl ketone and the like.

The alkyl substituted benzenes having from 1 to 3 carbon atoms which may be used include benzene, toluene, xylene, mesitylene, ethyl benzene, cumene and the like.

The alcohols used are the lower aliphatic alcohols having from 1 to 4 carbon atoms which include methyl, ethyl, propyl, isopropyl, butyl, isobutyl, sec-butyl and the like.

The polyurethane used in the instant composition is a polyol diisocyanate which is the reaction product of a polyol polyester with the di-isocyanate. This polyurethane is flexible and non-tacky. It is compatible with rosin for soldering operations. The polyurethane also is capable of being cured at room temperature up to 100° C. within thirty (30) minutes.

In order to describe the composition of the instant invention more fully, the following examples are presented:

EXAMPLE 1

59.5 grams of methyl ethyl ketone were added to a closed container under agitation.

10 grams of ground rosin were added to the ketone, followed by the addition of 12 grams of toluol, 18 grams of methyl alcohol and 0.5 gram of polyurethane. The polyurethane used in this and the following examples is a polyester polyol diisocyanate prepared and sold by Baker Castor Oil Company as Baker EC275X. This particular polyurethane is an isocyanate terminated reaction product of a castor oil based polyol, a polyalkylene glycol and toluene di-isocyanate. This mixture was agitated for 3 hours. After mixing the coating composition of the instant invention was obtained.

When this solution was applied onto a metal surface of a printed circuit board and allowed to dry, the dried coating that formed was non-tacky, flexible and continuous.

Upon subjecting the coated surface to a humidity chamber for 2 weeks at 80° F. and 80% relative humidity, no deterioration of the surface coating was observed. The coating was also compatible with a common rosin flux and therefore did not have to be removed prior to soldering.

EXAMPLE 2

Another coating composition was prepared using the following ingredients:

|  | Grams |
|---|---|
| Methyl ethyl ketone | 49.5 |
| Rosin | 20 |
| Toluol | 12 |
| Methyl alcohol | 18 |
| Polyurethane | 0.5 |

This coating composition produced a dry coating on metal which had the same properties of that produced in Example 1.

EXAMPLES 3-5

In these examples the procedure of Example I was repeated except that only methyl alcohol was used as the organic solvent. The amount of polyurethane was also varied. The ingredients used are recorded as follows:

| Example No. | 3 | 4 | 5 |
|---|---|---|---|
| Rosin, percent | 20 | 20 | 20 |
| Polyurethane, percent | 1.7 | 1.0 | 0.5 |
| Methanol, percent | 78.3 | 79.0 | 79.5 |

In all of these examples, the coatings after exposure to 80% relative humidity at 80° F. for 2 weeks were durable and continuous. No deterioration of the surface was observed. The coating also was compatible with a rosin flux soldering operation.

EXAMPLES 6-8

In these examples the organic solvent used was a combination of methyl ethyl ketone and toluol which were added in various proportions as follows:

| Example No. | 6 | 7 | 8 |
|---|---|---|---|
| Rosin, percent | 16.6 | 20.0 | 20.0 |
| Polyurethane, percent | 0.4 | 0.4 | 0.5 |
| Toluol, percent | 16.6 | 39.8 | 29.5 |
| Methyl ethyl ketone, percent | 66.4 | 39.8 | 55.0 |

These solutions also formed durable coatings on metal surfaces.

While this invention has been described and illustrated by the examples shown, it is not intended to be strictly limited thereto, and other variations and modifications may be employed within the scope of the following claims.

We claim:

1. A protective coating composition for metal surfaces, such as printed circuit boards and the like, which produces continuous and durable coatings which are also compatible with common rosin base fluxes, said composition consisting essentially of rosin, polyurethane and an organic solvent, said polyurethane being the reaction product of a polyol and a di-isocyanate which is flexible and non-tacky and compatible with rosin for soldering operations and is capable of being cured at room temperature up to 100° C. within thirty minutes, said solvent selected from the group consisting of a lower aliphatic ketone having from 3 to 8 carbon atoms, benzene and an alkyl substituted benzene in which the alkyl group contains from 1 to 3 carbon atoms, and an aliphatic alcohol having from 1 to 4 carbon atoms and mixtures thereof, said rosin being present in amount from 5% to 30%, the polyurethane in amount from 0.25% to 2.0% and the organic solvent in amount from 70% to 95%, all of the percentages expressed on a weight basis.

2. Composition according to claim 1 in which there are 10-50 parts of rosin for each part of polyurethane.

3. Composition according to claim 1 in which the organic solvent is an aliphatic alcohol having from 1 to 4 carbon atoms.

4. Composition according to claim 3 in which the aliphatic alcohol is methanol.

5. Composition according to claim 1 in which the organic solvent is a mixture of an alkyl substituted benzene and a lower aliphatic ketone.

6. Composition according to claim 5 in which the alkyl substituted benzene is toluol and the lower aliphatic ketone is methyl ethyl ketone.

7. Composition according to claim 1 in which the polyurethane is the reaction product of a polyol polyester with a di-isocyanate, said reaction product being flexible and non-tacky, compatible with rosin for soldering purposes and capable of being cured at room temperature up to 100° C. within thirty minutes.

8. Composition according to claim 1 in which the organic solvent is a mixture of a lower aliphatic ketone, an alkyl substituted benzene and an aliphatic alcohol.

9. Composition according to claim 8 in which the lower aliphatic ketone is methyl ethyl ketone, the alkyl substituted benzene is toluol and the aliphatic alcohol is methanol.

10. Composition according to claim 9 in which the amount of methyl ethyl ketone in the organic solvent is from 0% to 75%, the amount of toluol is from 0% to 50% and the amount of methanol is from 0% to 100%, all of the percentages based on the weight of the solvent.

11. Composition according to claim 1 in which the polyurethane is an isocyanate terminated reaction product of a castor oil based polyol, a polyalkylene glycol and toluene di-isocyanate.

References Cited

UNITED STATES PATENTS 3,242,230   3/1966   Habib _____ 260—24

DONALD E. CZAJA, Primary Examiner

W. PARKER, Assistant Examiner

U.S. Cl. X.R.

106—240; 260—77.5